United States Patent [19]

Kerimis et al.

[11] Patent Number: 4,689,376
[45] Date of Patent: Aug. 25, 1987

[54] HEAT-HARDENABLE EPOXIDE RESIN MIXTURES

[75] Inventors: Dimitrios Kerimis, Cologne; Hanns P. Müller, Odenthal; Walter Uerdingen; Heinrich Heine, both of Leverkusen, all of Fed. Rep. of Germany

[73] Assignee: Bayer Aktiengesellschaft, Leverkusen, Fed. Rep. of Germany

[21] Appl. No.: 808,176

[22] Filed: Dec. 12, 1985

[30] Foreign Application Priority Data

Dec. 22, 1984 [DE] Fed. Rep. of Germany ....... 3447251

[51] Int. Cl.[4] .................... C08G 59/68; C08G 59/42
[52] U.S. Cl. ..................................... 525/504; 528/89; 528/365
[58] Field of Search ............... 528/89, 365; 525/507, 525/504

[56] References Cited

U.S. PATENT DOCUMENTS

| | | | |
|---|---|---|---|
| 3,329,652 | 7/1967 | Christie | 528/89 X |
| 3,442,849 | 5/1969 | Tashlick et al. | 528/89 X |
| 3,784,583 | 1/1974 | Smith | 528/89 X |
| 4,026,862 | 5/1977 | Smith | 260/37 EP |

FOREIGN PATENT DOCUMENTS

| | | |
|---|---|---|
| 1584526 | 12/1969 | France . |
| 2260604 | 9/1975 | France . |
| 401473 | 5/1966 | Switzerland . |

*Primary Examiner*—Earl Nielsen
*Attorney, Agent, or Firm*—Connolly & Hutz

[57] ABSTRACT

This invention relates to heat-hardenable epoxide resin mixtures of at least one 1,2-polyepoxide having more than one 1,2-epoxide group per molecule, at least one cyclic carboxylic acid anhydride and at least one ammonium phosphonate or ammonium phosphate as a hardening catalyst, as well as further optional auxiliaries.

5 Claims, No Drawings

HEAT-HARDENABLE EPOXIDE RESIN MIXTURES

This invention relates to heat-hardenable epoxide resin mixtures of at least one 1,2-polyepoxide with more than one 1,2-epoxide group per molecule, at least one cyclic carboxylic acid anhydride and at least one ammonium phosphonate or ammonium phosphate as a hardening catalyst, as well as further optional auxiliaries.

It is known to use tertiary amines, for example dimethyl benzyl amine or tris-(dimethylaminomethyl)-phenol as accelerators for polymerization of 1,2-polyepoxide carboxylic acid anhydride mixtures. They make possible the desired short hardening times at elevated temperatures, however, they are already active at room temperature, to the extent that the duration of use is limited to a few hours as a result of an increase in viscosity.

Boron trifluoride amine addition products are known as latent catalysts. However, this class of compounds suffers from the disadvantage that they substantially catalyze the esterification reaction of the epoxide resins. Therefore, no acid anhydride hardeners can be used which are necessary for achieving optimal molding material properties and for lowering the viscosity of the liquid epoxide resin compositions.

Furthermore, phosphonium dimethyl phosphates and ammonium dimethyl phosphates in combination with carboxylic acids are known as latent catalysts for 1,2-polyepoxide carboxylic acid anhydride mixtures (DE-OS No. 2 505 234 and U.S. Pat. No. 3 784 583). These can only be used, however, in a restricted manner owing to their properties.

It has now been found that ammonium phosphate or ammonium phosphonate catalysts as latent catalysts which are activated by heat, can be used for hardening 1,2-polyepoxide carboxylic acid anhydride mixtures. These do not suffer from the above-mentioned disadvantages.

One of the advantages of the mixtures according to the invention is a substantial simplification and rationalization of casting resin technology. The long duration of use of the epoxide resin compositions renders superfluous the use of costly casting resin processing plants which are susceptible to disturbances, having charging or throughflow mixers. The requirement of casting resin compositions for several days is instead met by a single mixing process.

Mixing errors are thereby practically ruled out and labor time is saved. The casting resin compositions according to the invention can be particularly advantageously used for injection moulding processing according to DE-OS No. 2 017 506.

The invention thus provides heat-hardenable epoxide resin mixtures of at least one 1,2-polyepoxide having more than one 1,2-epoxide group per molecule, at least one cyclic carboxylic acid anhydride and at least one catalyst which is activated by heat, characterised in that compounds of the formula I

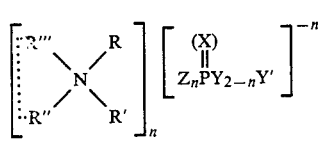

are used as catalysts wherein

R=H, a $C_1$–$C_6$-alkyl, $C_6$–$C_{10}$-cycloalkyl or -aryl group,

R', R'', R'''=R or together a heterocycle having from 5 to 7 carbon atoms, in which the carbon atoms can be substituted by heteroatoms and in which the quaternary nitrogen atom is part of the ring, X=O or S, Y and Y'=a $C_1$–$C_6$-alkoxy, $C_1$–$C_6$-thioalkoxy, $C_1$–$C_6$-alkyl, aryl or aryloxy group, Z=O or S and n=1 or 2.

The heat-hardenable epoxide resin mixtures according to the invention contain from 0.01 to 20% by weight, preferably from 0.1 to 10% by weight of the compounds of formula I. They can optionally be used as a mixture having from 5 to 100% by weight, based on the ammonium compounds to be used according to the invention, of catalysts known per se.

The mixture preferably contains at least one ammonium phosphate or ammonium phosphonate in the catalyst.

In a particular embodiment, mixtures of one or more cyclic dicarboxylic acid anhydrides and catalysts which contain at least one ammonium phosphate or ammonium phosphonate can be used as hardening mixtures.

The heat-hardenable mixtures according to the invention can be used as casting resin moulding materials as construction and insulating materials, for example for insulators, transformers, condensers, printed circuits, molded laminate materials, chemistry tubes and containers, sports equipment and for boat construction, among other things.

The catalysts according to the invention are generally reaction products of (i) alkyl phosphates or alkyl phosphonates of the formula (II)

wherein

R, X, Y, Y', Z and n have the same meanings as in formula I, with (ii) amines, amides or N-heterocycles of the formula (III)

wherein

R', R'' and R''' have the same meanings as in formula I.

Partially or completely alkylated derivatives of phosphonic acid or partially alkylated derivatives of phosphoric acid can be used as catalyst component (i), whereby partially alkylated phosphoric acids are preferred.

Examples of P-compounds suitable as catalyst component (i) are methane phosphonic acid dimethylesters and phosphoric acid dibutylesters.

The catalyst component (ii) refers to N-containing organic compounds, for example primary, secondary and tertiary amines, amides and N-heterocycles. Typical examples of N-compounds suitable as catalyst component (ii) are ammonia, triethylamine, dibutylamine, urea, melamine, hydrazine, triethylene diamine, hexamethylene tetramine, morpholine, 1,5-diazabicyclo[3.4.0]nones-5, 1,8-diazabicyclo[5.4.0]undec-7-ene, hexamethylene-1,6-diamine, mono-, di- and triethanolamine, ethylene diamine, pyridine and 1,4-diaminocyclohexane.

In principle, straight and cyclic compounds having one or more amino, imino, epimino or nitrilo group can be used as catalyst component (ii).

The production of the catalysts which can be used according to the invention takes place according to known processes (for example Houben-Weyl, vol. XII/2, p. 262 et seq) by reacting the components (i) and (ii) named by way of example, in the presence or absence of solvent at temperatures of from 100° to 200° C. It can thereby be advantageous to work under inert gas and/or pressure.

Particularly preferred examples of catalysts which can be used according to the invention are:

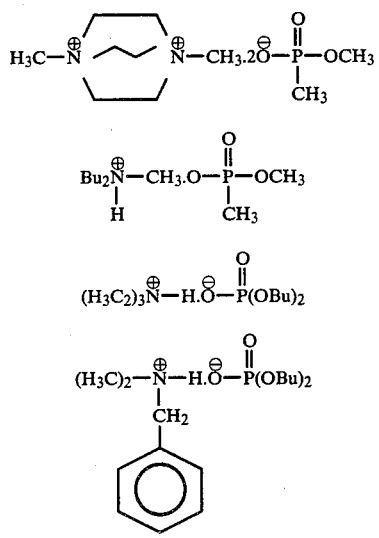

Based on 100 parts of a reaction mixture of 1,2-polyepoxides and cyclic acid anhydrides, they are used in a quantity of from 0.3 to 10 parts, optionally in admixture with each other.

Catalysts which are solid at room temperature are suitably dissolved in the acid anhydride hardener and used as hardener-activator mixtures.

The following can be used for carrying out the process according to the invention:

As 1,2-polyepoxides: aliphatic, cycloaliphatic, aromatic or heterocyclic compounds which on average contain more than one 1,2-epoxide group per molecule.

Usable 1,2-polyepoxide compounds can be polyglycidyl ethers of monovalent phenols, for example of catechol, resorcin, hydroquinone, of 4,4'-dihydroxydiphenylmethane, of 4,4'-dihydroxy-3,3'-dimethyldiphenylmethane, of 4,4'-dihydroxydiphenyldimethylmethane, of 4,4'-dihydroxydiphenylcyclohexane, of 4,4'-dihydroxy-3,3'-dimethyldiphenylpropane, of 4,4'-dihydroxydiphenyl, of 4,4'-dihydroxydiphenylsulphone, of tris-(4-hydroxyphenyl)-methane, of the chlorination and bromination products of the above-mentioned diphenols, of novolac (that is of reaction products of mono or polyvalent phenols with aldehydes, particularly formaldehyde, in the presence of acidic catalysts), of diphenols which were obtained by esterifying 2 mol of the sodium salt of an aromatic hydroxycarboxylic acid with 1 mol of a dihalogen alkane or dihalogendialkyl ether (c.f. GB Pat. No. 1 017 612), of polyphenols which were obtained by condensing phenols and long-chained, halogen paraffins containing at least two halogen atoms (c.f. GB-PS No. 1 024 288). The following are also mentioned:

Polyepoxide compounds based on aromatic amines and epichlorohydrin, for example N-di-(2,3-epoxypropyl)-aniline, N,N'-dimethyl-N,N'-diepoxypropyl-4,4'-diaminodiphenylmethane, N-diepoxypropyl-4-amino-phenylglycidether (c.f. GB-PS Nos. 772 830 and 816 923).

The following are also used: glycidylesters of polybasic, aromatic, aliphatic and cycloaliphatic carboxylic acids, for example phthalic acid diglycidyl esters, adipic acid diglycidyl esters and glycidyl esters of reaction products of 1 mol of an aromatic or cycloalipatic dicarboxylic acid anhydride and ½ mol of a diol or 1/n mol of a polyol with n hydroxy groups or hexahydrophthalic acid diglycidyl esters, which can be optionally substituted by methyl groups.

Glycidyl ethers of polyhydric alcohols, for example of 1,4-butanediol, 1,4-butenediol, glycerin, trimethylol propane, pentaerythrite and polyethylene glycols can likewise by used. Triglycidyl isocyanurate, N,N'-diepoxypropyloxamide, polyglycidylthioethers of polyvalent thiols, for example of bismercaptomethylbenzene, diglycidyl trimethylene trisulphone, polyglycidyl ethers based on hydantoins are of further interest.

Finally, epoxidization products of multiply unsaturated compounds, such as vegetable oils and the conversion products thereof, epoxidization products of di- and polyolefins, such as butadiene, vinyl cyclohexene, 1,5-cyclooctadiene, 1,5,9-cyclododecatriene, polymers and mixed polymers which also contain epoxidizable double bonds, for example based on polybutadiene, polyisoprene, butadiene-styrene mixed polymers, divinyl benzene, dicyclopentadiene, unsaturated polyesters, moreover, epoxidizable products of olefins which are accessible by Diels-Alder-Addition and are then converted by epoxidization with per compounds into polyepoxides or of compounds which contain two cyclopentene or cyclohexene rings linked by bridge atoms or groups of bridge atom groups. Furthermore, polymers of unsaturated monoepoxides are mentioned, for example of methacrylic acid glycidyl esters or allylglycidyl ethers.

The following polyepoxide compounds or mixtures thereof are preferably used for the process according to the invention:

Polyglycidyl ethers of polyvalent phenols, particularly of bisphenol A; polyepoxide compounds based on aromatic amines, particularly bis(N-epoxypropy)-aniline, N,N'-dimethyl-N,N'-diepoxypropyl-4,4'-diaminodiphenyl methane and N-diepoxypropyl-4-amino-phenyl glycidylether: polyglycidyl esters of cycloaliphatic dicarboxylic acids, particularly hexahydrophthalic acid diglycidyl esters and polyepoxides from the reaction product of n mols of hexahydrophathalic acid anhydride and 1 mol of a polyol with n hydroxyl groups (n=an integer of from 2 to 6), particularly of 3 mol of hexahydrophathalic acid anhydride and 1 mol of 1,1,1-trimethylol propane, 3,4-epoxycyclohexylmethyl-3,4-epoxycyclohexane-carboxylate.

Liquid polyepoxides can preferably be used or low viscosity diepoxides, such as bis(N-epoxypropyl)aniline or vinyl cyclohexene diepoxide. In particular cases, this can further reduce the viscosity of already liquid polyepoxides or convert solid epoxides into liquid mixtures.

Conventional di and polycarboxylic acid anhydrides can be used as acid anhydrides. Liquid or easily-melting dicarboxylic acid anhydrides are preferably used, for example hexahydrophthalic anhydride, methylhexahydrophthalic acid anhydride, methyl-endomethylene-tetrahydrophthalic acid anhydride, methyltetrahydrophthalic acid anhydride, tetrahydrophthalic acid anhydride; of the latter two, the isomer mixtures are particularly suitable.

Hardening can take place by mixing the 1,2-polyepoxide carboxylic acid anhydride mixtures with the catalyst which can be used according to the invention and further optional additives and by heating to relatively high temperatures.

The mixing ratio is suitably selected such that there is about one anhydride group to one 1,2-epoxide group; more or less anhydride (from about 0.6 to 1.2 mol of anhydride group per epoxide group) can also be used. It is also possible to additionally use further carboxylic acid anhydrides or hardening agents.

Hardening can be carried out at temperatures of from about 60° C. to 250° C., preferably from 80° C. to 180° C.

Hardening can also be interrupted at a desired point in time by cooling to, for example, room temperature and continued at a later point in time. The point in time for interrupting the reaction is suitably selected such that the mixture obtained on cooling (for example to room temperature) is present in the B phase, that is solid, and during later heating to the temperature of the final hardening, becomes liquid again or can be shaped under pressure. The use of this latter-mentioned process is particularly advantageous when molded laminate materials, molding compositions and coating compositions are taken as areas of use, for example according to the powder painting process.

Fillers can optionally be added as mixtures to the 1,2-polyepoxide resin composition, such as quartz powder, chalk, aluminium oxide, pigments such as titanium dioxide, iron oxide, organic pigments such as phthalocyanine pigments, flexibilizers such as polyglycols, polyether glycol, polyesters with terminal hydroxyl and/or carboxyl groups, polysulphides, soluble dyes, reinforcing materials such as glass fibres, woven materials or plasticizers.

The compositions according to the invention can be used as casting resin moulding materials, for example as building and insulating materials, for example for insulators, transformers, condensor, printed circuits, molded laminate materials, chemistry tubes and containers, sports equipment and for boat construction among other things.

EXAMPLES

EXAMPLE 1

Production of an ammonium compound to be used according to the invention 112 parts by weight of triethylene diamine (Dabco) and 1240 parts by weight of methane phosphonic acid dimethylester are stirred for 8 hours at 100° C. under slight flow through of nitrogen. About 400 parts by weight of the excess methane phosphonic acid ester are then distilled off under vacuum, the precipitated product is filtered off and dried under vacuum. 355 parts by weight of a colorless, crystalline compound are obtained.

EXAMPLE 2

Production of an ammonium compound to be used according to the invention 258 parts by weight of dibutylamine and 248 parts by weight of methane phosphonic acid dimethylester are mixed together and heated with stirring to from 135° to 150° C. Cooling is then carried out with an ice bath such that the exothermic reaction holds the temperature at from 140° to 150° C. Stirring then takes place for a further 5 hours at 150° C.

The obtained product is freed from unreacted starting products by distillation under vacuum. 350 parts by weight of a colourless, viscous liquid are obtained which slowly crystallizes with time.

EXAMPLE 3

Production of an ammonium compound to be used according to the invention 210 parts by weight of dibutylphosphate and 101 parts by weight of triethylamine are mixed together and stirred for 1 hour at 60° C.

EXAMPLE 4

Production of an ammonium compound to be used according to the invention 210 parts by weight of dibutylphosphate and 135 parts by weight of dimethylbenzylamine (Desmorapid DB) are mixed together and stirred for 1 hour at 60° C.

EXAMPLE 5

100 parts by weight of a commerical epoxide resin based on hexahydrophthalic acid diglycidyl ester with an epoxide equivalent of 160 and a viscosity of 900 mPas, measured at 25° C., (Lekutherm X 100) are mixed at room temperature with 100 parts by weight of a liquid methylhexahydrophthalic acid anhydride with a hardener equivalent of 168 and a viscosity of 40 mPas at 25° C. (Lekutherm Hardener M) and in each case 2 parts by weight of different accelerators.

A part of the mixtures is separated off and the gel time thereof is measured at 160° C. (values in the Table in seconds).

From the principal amount, the viscosity is determined at room temperature with a vane viscosimeter (O value in the Table in mPas at 25° C.). The samples are stored in air-tight sealed containers and the viscosity measurement is repeated after 24 hours, 48 hours, 96 hours and 11 days. The values can be seen in the table.

The gel time with all products is in about the same range of from 1 to 2 minutes. As the viscosity increases, clear differences result, whereby the catalysts according to the invention have substantially higher potlives than the comparative substances.

| | Increase in viscosity dependence on time, measured at 25° C. in the wing viscosimeter (mPas) | | | | | Gel time at 160° C. |
|---|---|---|---|---|---|---|
| | 0-value | 24 h | 48 h | 96 h | 11 days | |
| Catalyst according to the invention according to | | | | | | |
| Example 1 | 540 | 750 | 780 | 1000 | 3200 | 125" |
| Example 2 | 420 | 580 | 660 | 800 | 12400 | 89" |
| Example 3 | 410 | 520 | 530 | 600 | 1300 | 113" |
| Example 4 | 400 | 530 | 620 | 850 | 26300 | 93" |
| standard catalyst (trimethylbenzylamine) | 510 | 2480 | 27200 | semi-viscous | solid | 56" |
| comparative examples according to DE-OS 2 505 234 | | | | | | |
| A | 460 | 650 | 840 | 850· | solid | 57" |
| B | 490 | 740 | 920 | 1600 | solid | 81" |
| C | 440 | 610 | 760 | 1450 | solid | 79" |

A = triethylmethylammonium dimethylphosphate
B = trimethylbenzylammonium dimethylphosphate
C = tributylmethylphosphonium dimethylphosphate

We claim:

1. Heat-hardenable epoxide resin mixture of 1,2-polyepoxides having more than one 1,2-epoxide group per molecule, one or more cyclic carboxylic acid anhydrides, catalysts as well as optionally flexibilizers, fillers, pigments, fibers, woven materials and dyes, characterised in that compounds of the formula (I)

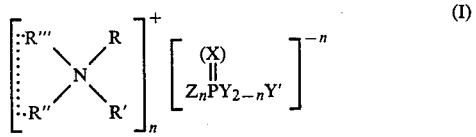

are used as catalysts, wherein
R=H, a $C_1$–$C_6$-alkyl, $C_6$–$C_{10}$-cycloalkyl or -aryl group,
R', R", R''', =R or together a heterocycle having from 5 to 7 carbon atoms, in which the carbon atoms can be substituted by heteroatoms and in which the quaternary nitrogen atom is part of the ring,
X=O or S,
Y and Y'=a $C_1$–$C_6$-alkoxy, $C_1$–$C_6$-thioalkoxy, $C_1$–$C_6$-alkyl, aryl or aryloxy group,
Z=O or S and
n=1 or 2.

2. A process for hardening epoxide resin mixtures of polyepoxides having more than one epoxide group per molecule, one or more cyclic dicarboxylic acid anhydrides and optionally flexibilizers, fillers and dyes, as well as catalysts in heat, characterised in that at least one ammonium phosphate or ammonium phosphonate is used according to claim 1 as catalyst.

3. A process for heat-hardening epoxide resin mixtures of polyepoxides with more than one epoxide group per molecule, optional flexibilizers, fillers and dyes, as well as hardening mixtures, characterised in that mixtures of one or more cyclic carboxylic acid anhydrides and catalysts, which contain at least one ammonium phosphate or ammonium phosphonate according to claim 1 are used as hardening mixtures.

4. Heat-hardenable epoxide resin mixtures of at least one 1,2-polyepoxide having more than one 1,2-epoxide group per molecule and at least one cyclic carboxylic acid anhydride and at least one catalyst which comprises

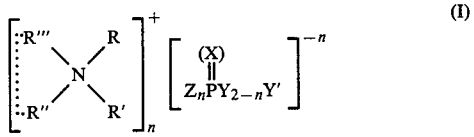

are used as catalysts, wherein
R=H, a $C_1$–$C_6$-alkyl, $C_6$–$C_{10}$-cycloalkyl or -aryl group,
R', R", R''', =R or together a heterocycle having from 5 to 7 carbon atoms, in which the carbon atoms can be substituted by heteroatoms and in which the quaternary nitrogen atom is part of the ring, X=O or S, Y and Y'=a $C_1$–$C_6$-alkoxy, $C_1$–$C_6$-thioalkoxy, $C_1$–$C_6$-alkyl, aryl or aryloxy group, Z—O or S and n=1 or 2.

5. Building and insulating materials comprising casting resin molding materials according to claim 1.

* * * * *